(12) United States Patent
Tanaka et al.

(10) Patent No.: US 10,950,951 B2
(45) Date of Patent: Mar. 16, 2021

(54) RADAR DEVICE

(71) Applicant: MITSUBISHI ELECTRIC CORPORATION, Tokyo (JP)

(72) Inventors: Tai Tanaka, Tokyo (JP); Michio Takikawa, Tokyo (JP); Takashi Maruyama, Tokyo (JP); Shigeo Udagawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/003,451

(22) Filed: Aug. 26, 2020

(65) Prior Publication Data

US 2020/0393537 A1    Dec. 17, 2020

Related U.S. Application Data

(63) Continuation of application No. PCT/JP2018/011774, filed on Mar. 23, 2018.

(51) Int. Cl.
*H01Q 17/00* (2006.01)
*B60W 40/00* (2006.01)
*G01S 7/35* (2006.01)
*G01S 13/08* (2006.01)
(Continued)

(52) U.S. Cl.
CPC .......... *H01Q 17/008* (2013.01); *B60W 40/00* (2013.01); *G01S 7/354* (2013.01); *G01S 13/08* (2013.01); *H01Q 1/42* (2013.01); *H01Q 17/007* (2013.01); *B60W 2420/52* (2013.01); *G01S 13/931* (2013.01); *H01Q 17/00* (2013.01)

(58) Field of Classification Search
CPC .... H01Q 17/00; H01Q 17/007; H01Q 17/008; H01Q 15/02; H01Q 15/08; H01Q 1/42; H01Q 1/421; H01Q 1/422; G01S 13/931
See application file for complete search history.

(56) References Cited

U.S. PATENT DOCUMENTS 2,415,352 A * 2/1947 Iams ...................... H01Q 15/02
                                                   343/783
4,725,475 A * 2/1988 Fiscus .................... H01Q 1/422
                                                   343/872
(Continued)

FOREIGN PATENT DOCUMENTS

JP    2000-506705 A    5/2000
JP    2008-249678 A    10/2008
(Continued)

OTHER PUBLICATIONS

International Search Report (PCT/ISA/210) issued in PCT/JP2018/011774 dated Jun. 12, 2018.

*Primary Examiner* — Peter M Bythrow
(74) *Attorney, Agent, or Firm* — Birch, Stewart, Kolasch & Birch, LLP

(57) ABSTRACT

Included are: a radar main unit for emitting a radar wave and receiving a reflection wave of the radar wave reflected by an object; and a dielectric substrate in which multiple matching layers each having a protruded shape are regularly arranged on one surface of the dielectric substrate, and the radar wave emitted from the radar main unit enters the multiple matching layers in a state where the other-surface side of the dielectric substrate is attached to a windshield.

14 Claims, 8 Drawing Sheets

(51) Int. Cl.
*H01Q 1/42* (2006.01)
*G01S 13/931* (2020.01)

(56) References Cited

U.S. PATENT DOCUMENTS

| | | | | |
|---|---|---|---|---|
| 5,486,950 A * | 1/1996 | Collinge | | H01Q 19/065 |
| | | | | 343/753 |
| 5,675,349 A * | 10/1997 | Wong | | G01S 13/426 |
| | | | | 343/910 |
| 6,043,769 A * | 3/2000 | Rowe | | H01Q 17/00 |
| | | | | 342/1 |
| 6,313,802 B1 * | 11/2001 | Petersson | | H01Q 15/04 |
| | | | | 343/753 |
| 6,496,138 B1 * | 12/2002 | Honma | | H01Q 1/42 |
| | | | | 342/70 |
| 6,674,412 B1 * | 1/2004 | Schmidt | | H01Q 25/00 |
| | | | | 343/872 |
| 6,750,819 B2 * | 6/2004 | Rahaim | | H01Q 1/405 |
| | | | | 342/13 |
| 7,084,836 B2 * | 8/2006 | Espenscheid | | H01Q 15/14 |
| | | | | 343/840 |
| 8,797,207 B2 * | 8/2014 | Kienzle | | B29C 45/2624 |
| | | | | 342/124 |
| 9,112,278 B2 * | 8/2015 | Shi | | H01Q 25/002 |
| 9,293,812 B2 * | 3/2016 | Shi | | H01Q 21/08 |
| 2004/0036645 A1 * | 2/2004 | Fujieda | | G01S 7/032 |
| | | | | 342/70 |
| 2005/0035917 A1 * | 2/2005 | Nagano | | H01Q 19/08 |
| | | | | 343/786 |
| 2005/0062664 A1 * | 3/2005 | Hidai | | H01Q 1/42 |
| | | | | 343/786 |
| 2006/0125705 A1 * | 6/2006 | Nagano | | H01Q 13/02 |
| | | | | 343/786 |
| 2006/0202909 A1 * | 9/2006 | Nagai | | H01Q 15/08 |
| | | | | 343/911 R |
| 2009/0058749 A1 * | 3/2009 | Shimoi | | H01Q 13/02 |
| | | | | 343/786 |
| 2011/0163904 A1 * | 7/2011 | Alland | | B60R 1/00 |
| | | | | 342/1 |
| 2011/0279304 A1 * | 11/2011 | Yonemoto | | H01Q 1/3225 |
| | | | | 342/52 |
| 2015/0207217 A1 * | 7/2015 | Fujita | | G01S 7/2813 |
| | | | | 343/872 |
| 2016/0006129 A1 * | 1/2016 | Haziza | | H01Q 15/08 |
| | | | | 343/783 |
| 2016/0268693 A1 * | 9/2016 | Ding | | G01S 13/931 |
| 2017/0207513 A1 * | 7/2017 | Miyoshi | | H01Q 1/38 |
| 2018/0239011 A1 * | 8/2018 | Dean | | G01S 7/03 |
| 2020/0328524 A1 * | 10/2020 | Deng | | H01Q 19/06 |

FOREIGN PATENT DOCUMENTS

| | | | |
|---|---|---|---|
| JP | 2009198627 A * | 9/2009 | G02B 1/11 |
| JP | 2010-230661 A | 10/2010 | |
| JP | 2012-107913 A | 6/2012 | |
| JP | 2017-129418 A | 7/2017 | |

* cited by examiner

RADAR DEVICE

CROSS REFERENCE TO RELATED APPLICATIONS

This application is a Continuation of PCT International Application No. PCT/JP2018/011774, filed on Mar. 23, 2018, which is hereby expressly incorporated by reference into the present application.

TECHNICAL FIELD

The present invention relates to a radar device installed in a vehicle compartment.

BACKGROUND ART

In late years, various sensors are attached to vehicles. For example, millimeter-wave band radar devices (hereinafter referred to as radars) are used for measurement of distance from an object. Since such radars perform measurement using an electromagnetic wave in the millimeter wave band, they are effective at night when using sensors of optical bands entails difficulty. Meanwhile, the radars are often attached to the bottom of the vehicle or in the back of the emblem from the viewpoint of design. However, there is a possibility that the performance of radars is greatly deteriorated at these attachment positions as described below.

A radar attached to the bottom of a vehicle is greatly affected by multipath formed by the reflection wave of a radar wave reflected by the ground. For example, a null direction in which the radar reception sensitivity is greatly reduced is formed in the detection area due to the multipath wave.

Alternatively, in a radar attached to the back of an emblem, there are cases where the radar wave is scattered by the emblem and thus an appropriate beam pattern is not formed. This is a major factor that degrades the detection performance of the radar.

Meanwhile, Patent Literature 1 describes a radar installed in a vehicle compartment. This radar is attached inside the vehicle compartment at an upper part of the windshield. As a result, the influence of the multipath wave on the radar is reduced, and the design is not impaired since the radar is not exposed to the outside of the vehicle. However, if the scattering and loss of the radar wave in the windshield are large, the gain of the radar is greatly reduced, and thus the detection range shrinks.

Meanwhile, the radar described in Patent Literature 1 includes a dielectric layer provided on the windshield. It is difficult to reduce the loss of electromagnetic waves propagated by the windshield since it largely depends on the physical properties of the material of the windshield. However, the reflection of electromagnetic waves by the surface of the windshield is reduced by providing the dielectric layer.

CITATION LIST

Patent Literature

Patent Literature 1: JP 2017-129418 A

SUMMARY OF INVENTION

Technical Problem

In the radar described in Patent Literature 1, a radar wave is obliquely incident on the glass surface, and thus it is difficult to control the transmission characteristic of the radar wave in the dielectric layer.

In addition, it is difficult to attach a dielectric substrate (dielectric layer) that is generally hard and not flexible since the windshield is not a uniform plane.

This invention solves the above disadvantages, and an object of the invention is to obtain a radar device that can improve the transmission characteristic of a radar wave incident on a dielectric surface.

Solution to Problem

A radar device according to the present invention includes: a radar main unit to emit a radar wave and receive a reflection wave of the radar wave reflected by an object; and a dielectric substrate in which multiple dielectric units each having a protruded shape are regularly arranged on one surface of the dielectric substrate, and the radar wave emitted from the radar main unit enters the multiple dielectric units in a state where another-surface side of the dielectric substrate is attached to a dielectric surface. The dielectric units each protrude stepwise, or in each of the multiple dielectric units, a direction vector of a straight line connecting a distal end and a center point of a bottom of the protruded shape is facing an orientation of the radar wave in the radar main unit.

Advantageous Effects of Invention

According to the present invention, a radar wave enters the dielectric units each having a protruded shape, and thus reflection of the radar wave at the dielectric surface is suppressed. As a result, the transmission characteristic of the radar wave incident on the dielectric surface is improved.

DESCRIPTION OF EMBODIMENTS

To describe the present invention further in detail, embodiments for carrying out the invention will be described below with reference to the accompanying drawings.

First Embodiment

Figure 1:
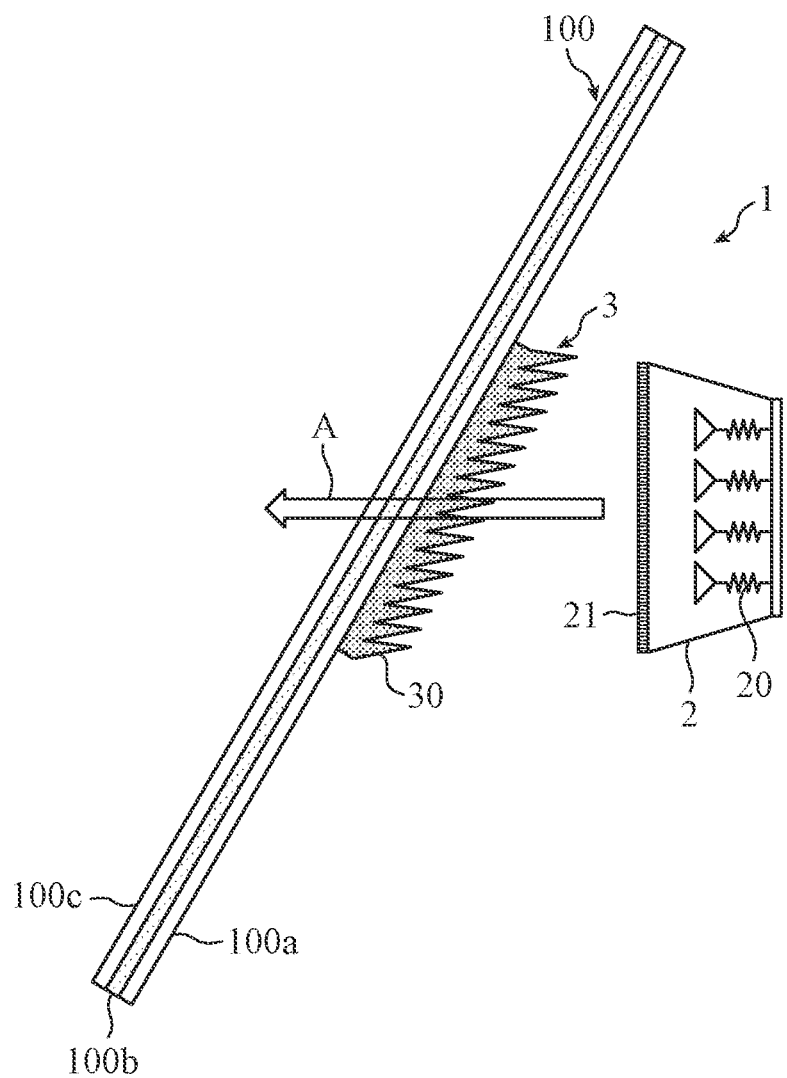
FIG. 1 is a cross-sectional view illustrating a configuration of a radar device according to a first embodiment of the invention.

FIG. 1 is a cross-sectional view illustrating a configuration of a radar device 1 according to a first embodiment of the invention. As illustrated in FIG. 1, the radar device 1 includes a radar main unit 2 and a dielectric substrate 3. The radar main unit 2 and the dielectric substrate 3 are installed inside a vehicle compartment. The radar main unit 2 emits a radar wave A ahead of the vehicle, and detects the distance from the vehicle to an object or an azimuth in which the object is located on the basis of the result of receiving the reflection wave of the radar wave A reflected by the object at the destination of the radar wave A.

The radar main unit 2 includes multiple antenna elements 20 and a radar cover 21. The radar antenna that transmits and receives the radar wave A includes the multiple antenna elements 20, and the antenna elements are arranged in an array, for example. The radar cover 21 is a member that transmits the radar wave A, and is provided in such a way as to cover the open surface for the radar antenna. The radar cover 21 is, for example, a dielectric member, and is desirably made of the same material as the dielectric substrate 3.

The dielectric substrate 3 is a dielectric member, in which multiple dielectric units 30 each having a protruded shape are regularly arranged on one surface, and the other-surface side is attached to a surface of a windshield 100 on the vehicle compartment side. The radar wave A emitted from the radar main unit 2 enters the dielectric units 30 included in the dielectric substrate 3 attached to the windshield 100 as indicated by an arrow in FIG. 1.

As illustrated in FIG. 1, there is a gap provided between the radar main unit 2 and the dielectric units 30, and thus the antenna elements 20 and the dielectric units 30 are not in contact with each other. The dielectric units 30 function as a matching layer that matches the spatial impedance for the radar wave A. The radar wave A enters the windshield 100 while achieving spatial impedance matching from the distal end of the protruded shape of the dielectric unit 30.

The windshield 100 is a dielectric member included in the vehicle (illustration of the entire vehicle is omitted) on which the radar device 1 is mounted, and a surface of the windshield 100, the dielectric substrate 3 being attached to the surface, is a dielectric surface. The windshield 100 has, for example, a three-layer structure of a first layer 100a, a second layer 100b, and a third layer 100c.

Figure 2:
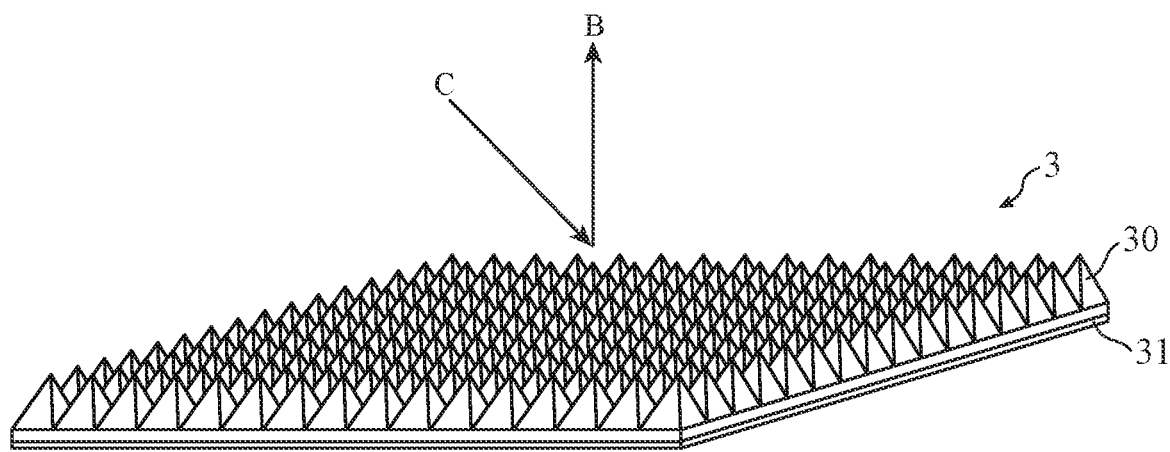
FIG. 2 is a perspective view illustrating a dielectric substrate of the first embodiment.

FIG. 2 is a perspective view illustrating the dielectric substrate 3 of the first embodiment. As illustrated in FIG. 2, the multiple dielectric units 30 each having a protruded shape are regularly arranged on one surface of the dielectric substrate 3, and thereby the dielectric substrate 3 has a three-dimensional shape unlike flat plate-like dielectric substrates of the related art. In FIG. 2, the dielectric units 30 each have, for example, a quadrangular pyramid shape.

The dielectric substrate 3 includes an adhesive layer 31 on the other surface thereof, and is attached to the surface of the windshield 100 on the vehicle compartment side via the adhesive layer 31. It is desirable that the adhesive contained in the adhesive layer 31 be a material that has a low permittivity and can bond with a thickness of about $0.1\lambda_c/(\varepsilon_f)^{1/2}$ where the symbol $\varepsilon_f$ represents the relative permittivity of the windshield 100. The symbol $\lambda_c$ represents the wavelength of the center frequency $f_c$ of the radar wave.

It is desirable that the relative permittivity $\varepsilon_m$ of the dielectric substrate 3 including the dielectric units 30 be close to the relative permittivity $\varepsilon_f$ of the windshield 100. For example, the material of the dielectric substrate 3 may be transparent and flexible polycarbonate (relative permittivity $\varepsilon_m$ is about 3) or polyurethane (relative permittivity $\varepsilon_m$ is about 5).

The normal direction of the surface of the windshield 100, the dielectric substrate 3 being attached to the surface, is denoted by B, and the incident direction of the radar wave A emitted from the radar main unit 2 on the dielectric substrate 3 is denoted by C. The incident direction C of the radar wave A is inclined with respect to the normal direction B of the glass surface, and thus the radar wave A is obliquely incident on the windshield 100.

Figure 3A:
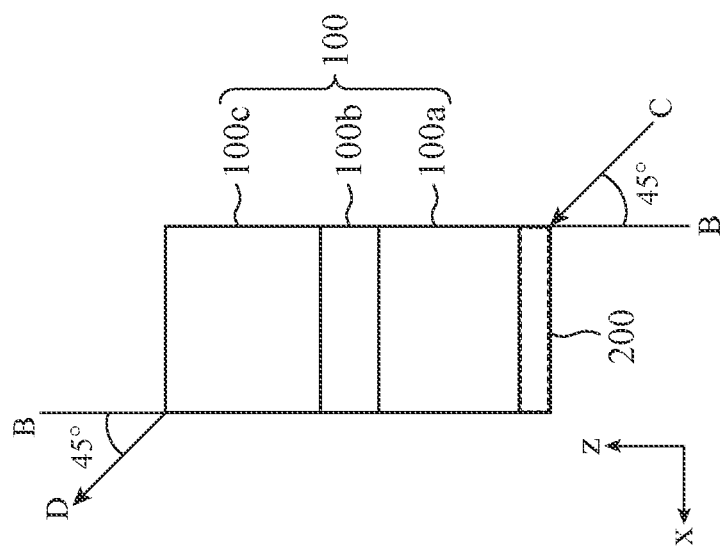
FIG. 3A is a cross-sectional view illustrating cross sections of the dielectric substrate and a windshield of the first embodiment cut along an xz plane.
Figure 3B:
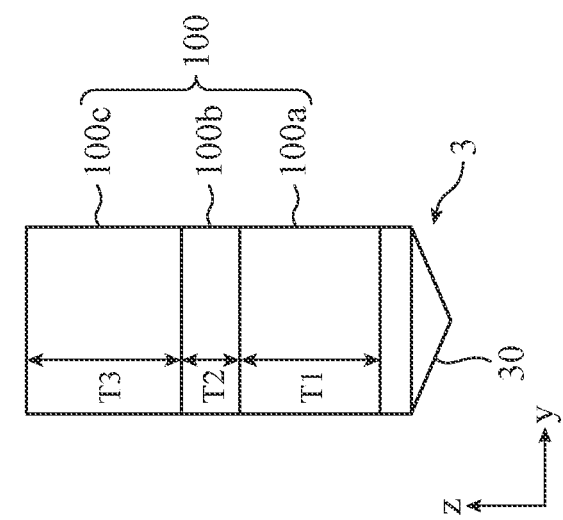
FIG. 3B is a cross-sectional view illustrating cross sections of the dielectric substrate and the windshield of the first embodiment cut along a yz plane.
Figure 3C:
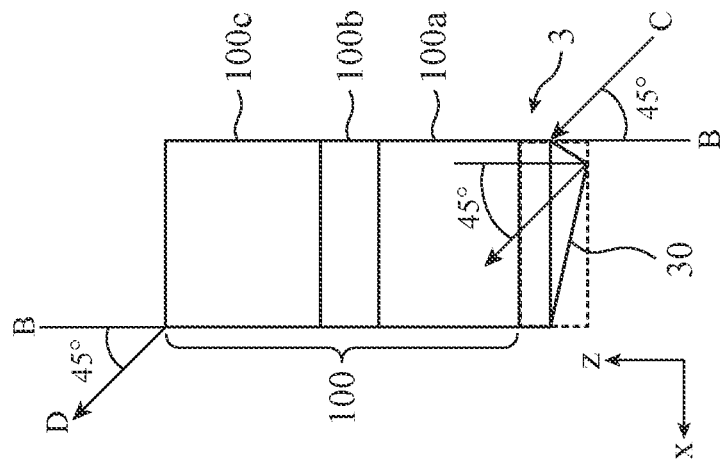
FIG. 3C is a cross-sectional view illustrating cross sections of a dielectric substrate of the related art and the windshield cut along an xz plane.

FIG. 3A is a cross-sectional view illustrating cross sections of the dielectric substrate 3 and the windshield 100 cut along an xz plane. FIG. 3B is a cross-sectional view illustrating cross sections of the dielectric substrate 3 and the windshield 100 cut along a yz plane. FIG. 3C is a cross-sectional view illustrating cross sections of a dielectric substrate 200 of the related art and the windshield 100 cut along an xz plane. Although the dielectric substrate 3 is attached to the windshield 100 via the adhesive layer 31 illustrated in FIG. 2, illustration of the adhesive layer 31 is omitted in FIGS. 3A and 3B. Likewise, in FIG. 3C, illustration of an adhesive layer for attaching the dielectric substrate 200 of the related art to the windshield 100 is omitted.

In the quadrangular pyramid-shaped dielectric unit 30 included in the dielectric substrate 3, the length of each side of the bottom of the quadrangular pyramid is 0.1 to 0.2 times the wavelength $\lambda_c$ of the center frequency $f_c$ of the radar wave A emitted from the radar main unit 2, namely $0.1\lambda_c$ to $0.2\lambda_c$. The height of the quadrangular pyramid is 0.1 to 0.2 times the wavelength $\lambda_c$, namely $0.1\lambda_c$ to $0.2\lambda_c$. The thickness of the dielectric substrate 3 located under the dielectric units 30 is 0.5 to 1.0 times the wavelength $\lambda_c$, namely $0.5\lambda_c$ to $1.0\lambda_c$.

The absolute value of an inner product of the direction vector of a straight line connecting the apex of the quadrangular pyramid that forms the dielectric unit 30 and the center point of the bottom of the quadrangular pyramid and the incident direction vector of the radar wave A is equal to or less than cos(30°) even when the incident angle of the radar wave A is changed from 45°.

The size of the dielectric substrate 3 is larger than or equal to the size that can cover the area of the beam pattern formed by the radar antenna. For example in a case where the distance between the radar antenna whose beam pattern ranges ±60° from the center in the radiation direction and the dielectric units 30 is 50 mm, the minimum size that allows the dielectric substrate 3 to function as a matching layer is 50 mm.

In FIGS. 3A, 3B, and 3C, the radar wave A is incident obliquely at an angle of 45° with respect to the normal direction B of the windshield 100 in an incident direction C, and exits at an angle of 45° with respect to the normal direction B in an emission direction D. In FIG. 3A and FIG. 3B, the dielectric unit 30 has a relative permittivity $\lambda_m$ of 5 and a dielectric tangent of 0.001, each side of the bottom of the quadrangular pyramid has a length of $0.6\lambda_c$, the height of the quadrangular pyramid is $0.125\lambda_c$, and the thickness of the dielectric substrate 3 is $0.1\lambda_c$.

The windshield 100 has a three-layer structure used for general vehicles. In the three-layer structure, the thickness T1 of the first layer 100a is set to $0.5\lambda_c$, the thickness T2 of the second layer 100b is set to $0.18\lambda_c$, and the thickness T3 of the third layer 100c is set to $0.5\lambda_c$. The dielectric substrate 200 of the related art has a structure obtained by removing the dielectric units 30 from the dielectric substrate 3, and has a thickness of $0.1\lambda_c$.

Figure 4:
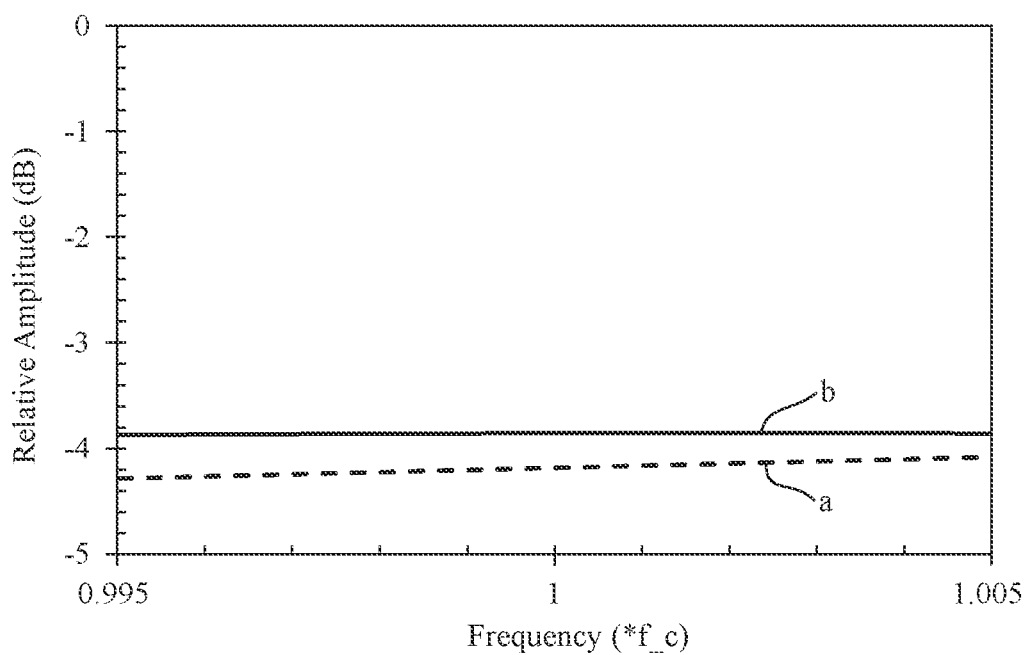
FIG. 4 is a graph illustrating a calculation result of the relationship between the frequency of a radar wave incident on a dielectric substrate and the relative amplitude of the radar wave transmitted by the dielectric substrate.

FIG. 4 is a graph illustrating a calculation result of the relationship between the frequency of a radar wave incident on the dielectric substrate and the relative amplitude of the radar wave transmitted by the dielectric substrate. Illustrated are simulation results of the frequency characteristic of transmission of a radar wave in the structure of the dielectric substrate 3 including the dielectric units 30 illustrated in FIG. 3A and FIG. 3B and the frequency characteristic of transmission of a radar wave in the structure of the dielectric substrate 200 of the related art illustrated in FIG. 3C. In FIG. 4, the characteristic indicated by the broken line a represents the calculation result obtained with the structure of the dielectric substrate 200 of the related art, and the characteristic indicated by the solid line b represents the calculation result obtained with the structure of the dielectric substrate 3.

As illustrated in FIG. 4, the characteristic indicated by the solid line b always has a relative amplitude higher than that of the characteristic indicated by the broken line a, and thus the structure of the dielectric substrate 3 has an improved relative characteristic as compared to the dielectric substrate 200 of the related art in terms of transmission of the radar wave. The radar wave propagated by the dielectric substrate 3 enters the windshield 100 after being subjected to a gradual spatial impedance change from the distal end of the quadrangular pyramid that forms the dielectric unit 30.

That is, the radar wave enters the windshield 100 while achieving spatial impedance matching from the distal end to the bottom of the quadrangular pyramid, and thus reflection by the windshield 100 can be suppressed. As a result, the transmission characteristic of the radar wave incident on the windshield 100 is improved.

Note that the dielectric unit 30 is not limited to a quadrangular pyramid shape.

Each of the dielectric units 30 of the first embodiment may have a polygonal pyramid shape other than the quadrangular pyramid or may have a conical shape, as long as the shape allows for a gradual spatial impedance change from the distal end of a protruded shape when the radar wave is propagated.

In addition, the dielectric substrate 3 of the first embodiment can be mounted on a curved surface.

Figure 5A:
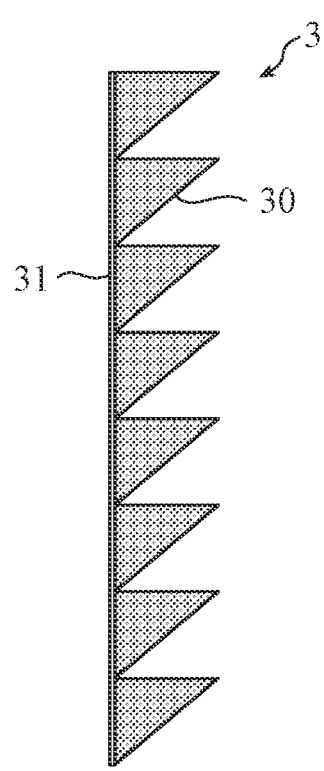
FIG. 5A is a side view illustrating the dielectric substrate of the first embodiment.
Figure 5B:
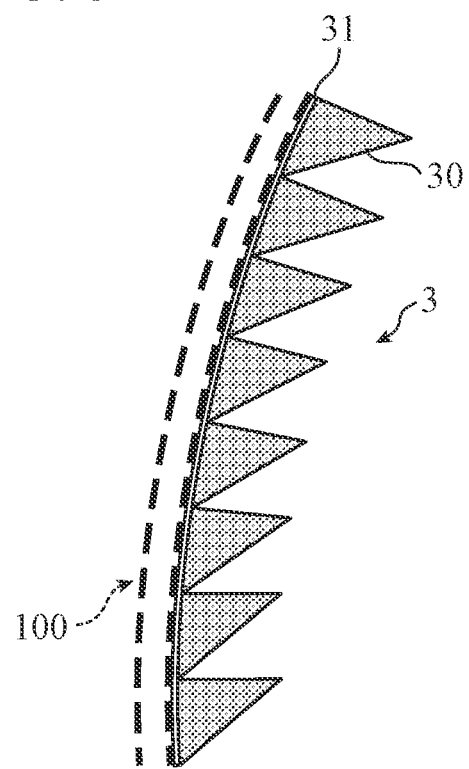
FIG. 5B is a side view schematically illustrating the windshield to which the dielectric substrate of the first embodiment is attached.

FIG. 5A is a side view illustrating the dielectric substrate 3, in which illustration of the thickness of the dielectric substrate 3 is omitted. FIG. 5B is a side view schematically illustrating the windshield 100 to which the dielectric substrate 3 is attached, and illustration of the thickness of the dielectric substrate 3 is omitted like in FIG. 5A.

Usually, the windshield 100 has a curved surface shape. For this reason, when a dielectric substrate made of a dielectric material that is not highly flexible is attached to the windshield 100, a gap is formed between the dielectric substrate and the windshield 100. Even if a curved dielectric substrate is designed in such a way as to fit this gap, it is likely that a gap is similarly formed between the dielectric substrate and the windshield 100 since there is a manufacturing tolerance of the windshield 100.

In contrast, the dielectric substrate 3 according to the first embodiment can be more flexible as compared to a dielectric substrate having no three-dimensional shape by allowing the thickness of the dielectric substrate 3 on the bottom side of the dielectric units 30 to be sufficiently thin, since the multiple three-dimensional dielectric units 30 are regularly arranged.

As a result, the dielectric substrate 3 according to the first embodiment can be attached along the curved surface of windshield 100 via the adhesive layer 31 as illustrated in FIG. 5B.

As described above, the radar device 1 according to the first embodiment includes the radar main unit 2 for emitting a radar wave and receiving a reflection wave of the radar wave reflected by an object; and the dielectric substrate 3 in which the multiple dielectric units 30 each having a protruded shape are regularly arranged on one surface of the dielectric substrate 3, and the radar wave emitted from the radar main unit 2 enters the multiple dielectric units 30 in a state where the other-surface side of the dielectric substrate 3 is attached to the windshield 100. When a radar wave enters the dielectric unit 30 having a protruded shape, the radar wave enters the windshield 100 while achieving spatial impedance matching from the distal end of the protruded shape, and thus reflection of the radar wave at the windshield 100 is suppressed. As a result, the transmission characteristic of the radar wave incident on the windshield 100 is improved.

Second Embodiment

Figure 6:
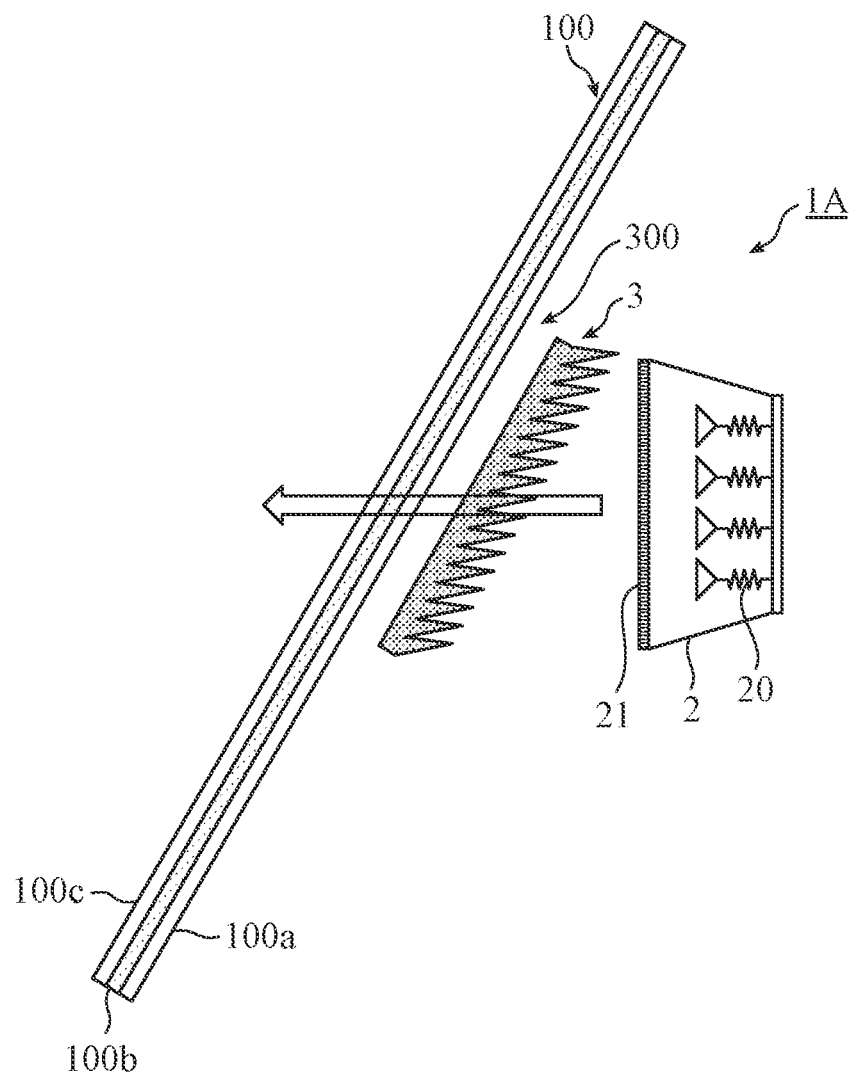
FIG. 6 is a cross-sectional view illustrating a configuration of a radar device according to a second embodiment of the invention.

FIG. 6 is a cross-sectional view illustrating a configuration of a radar device 1A according to a second embodiment of the invention. In FIG. 6, the same component as that in FIG. 1 is denoted by the same symbol and description thereof is omitted. The radar device 1A according to the second embodiment includes a gap 300 between a dielectric substrate 3 and a windshield 100 as illustrated in FIG. 6.

It is desirable that the gap 300 be an interval of 0.1 to 0.5 times the wavelength $\lambda_c$ of the center frequency $f_c$ of the radar wave A emitted from a radar main unit 2, namely $0.12\lambda_c$ to $0.5\lambda_c$. Including the gap 300 makes the adhesive layer 31 of the dielectric substrate 3 unnecessary. Moreover, the dielectric substrate 3 can be attached without consideration of the curved surface of the windshield 100, thereby facilitating the attaching work of the dielectric substrate 3 to the windshield 100.

As a method of attaching the dielectric substrate 3 to the windshield 100 while creating the gap 300, for example, a holder of a frame shape for supporting the outer edge of the dielectric substrate 3 may be prepared, and the holder that is supporting the dielectric substrate 3 may be attached to the windshield 100.

Third Embodiment

Figure 7:
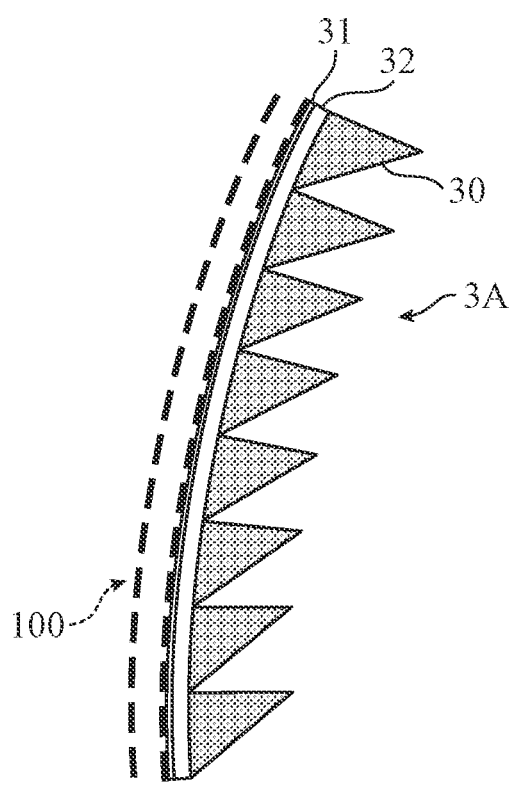
FIG. 7 is a side view schematically illustrating a windshield to which a dielectric substrate of a third embodiment of the invention is attached.

FIG. 7 is a side view schematically illustrating a windshield 100 to which a dielectric substrate 3A of a third embodiment of the invention is attached. In FIG. 7, the same component as that in FIG. 1 is denoted by the same symbol and description thereof is omitted. A radar device according to the third embodiment includes a reflection suppression layer 32 between the dielectric substrate 3A and the windshield 100 as illustrated in FIG. 7. An adhesive layer 31 may be interposed between the reflection suppression layer 32 and the windshield 100.

The reflection suppression layer 32 is a dielectric layer having a permittivity Ex of a value between the permittivity $\varepsilon_m$ of the dielectric substrate 3A and the permittivity $\varepsilon_f$ of the windshield 100.

Since the permittivity of the dielectric substrate 3A and the permittivity of the windshield 100 are different from each other, reflection of a radar wave occurs that is an electromagnetic wave. Although it is possible to reduce reflection of the radar wave by changing the thickness or the permittivity of the dielectric substrate, a material having a permittivity that can appropriately suppress reflection of the radar wave is not always available.

Therefore, in the third embodiment, the reflection suppression layer 32 is included between the dielectric substrate 3A and the windshield 100. As described above, the difference in the permittivity between the dielectric substrate 3A and the windshield 100 is reduced by the reflection suppression layer 32 having a permittivity Ex of a value between the permittivity $\varepsilon_m$ and the permittivity cf., and thus reflection of the radar wave is suppressed.

Fourth Embodiment

Figure 8:
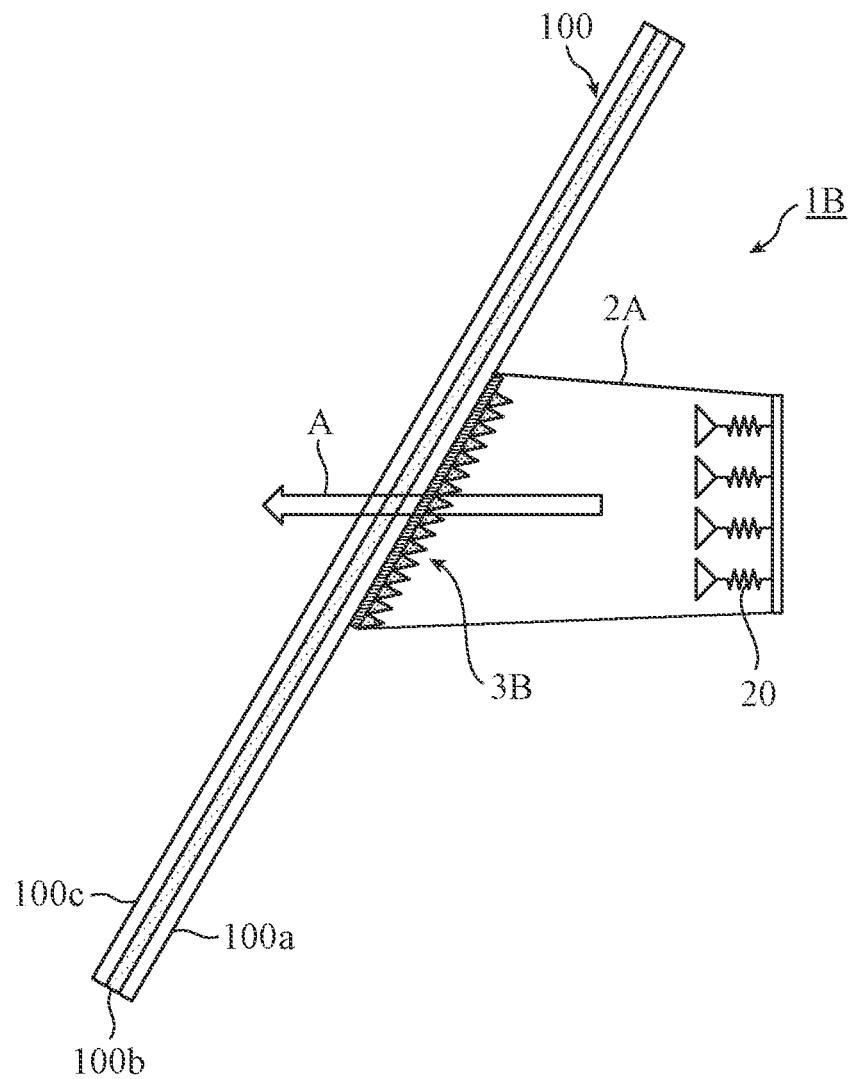
FIG. 8 is a cross-sectional view illustrating a configuration of a radar device according to a fourth embodiment of the invention.

FIG. 8 is a cross-sectional view illustrating a configuration of a radar device 1B according to a fourth embodiment of the invention. In FIG. 8, the same component as that in FIG. 1 is denoted by the same symbol and description thereof is omitted. In the radar device 1B according to the fourth embodiment, as illustrated in FIG. 8, a radar main unit 2A and a dielectric substrate 3B are included in one housing, and the dielectric substrate 3B functions also as a radar cover of the radar main unit 2A. Precise position adjustment between the radar main unit 2A and the dielectric substrate 3B is achieved in this housing.

The dielectric substrate 3B is provided in such a way as to cover the open surface for the radar antenna of the radar main unit 2A in a state where the surface on which multiple dielectric units 30 each having a protruded shape are arranged is facing the radar main unit 2A.

The dielectric substrate 3B is attached to the windshield 100 on the surface where the dielectric units 30 are not arranged. For example in a case where the radar main unit 2A is attached to the ceiling of the vehicle compartment, the dielectric substrate 3B and the windshield 100 do not need to be bonded together. In this case, it is desirable that the gap formed between the dielectric substrate 3B and the windshield 100 be an interval of 0.1 to 0.5 times the wavelength $\lambda_c$ of the center frequency $f_c$ of the radar wave A emitted from the radar main unit 2, namely $0.1\lambda_c$ to $0.5\lambda_c$, as illustrated in the second embodiment.

Meanwhile, the dielectric substrate 3B may be attached to the windshield 100 via an adhesive layer 31. The radar main unit 2A may be supported by the dielectric substrate 3B attached to the windshield 100. Furthermore, the reflection suppression layer 32 illustrated in the third embodiment may be included between the adhesive layer 31 of the dielectric substrate 3B and the windshield 100.

As described above, in the radar device 1B according to the fourth embodiment, the dielectric substrate 3B is a radar cover that covers the open surface for the radar antenna included in the radar main unit 2A.

With this configuration, the radar main unit 2A and the dielectric substrate 3B can be included in one housing. In this housing, the positions of the radar main unit 2A and the dielectric substrate 3B are aligned appropriately. Thus, a worker who installs the radar device 1B in the vehicle compartment does not need to perform precise position adjustment between the radar main unit 2A and the dielectric substrate 3B.

Fifth Embodiment

Figure 9:
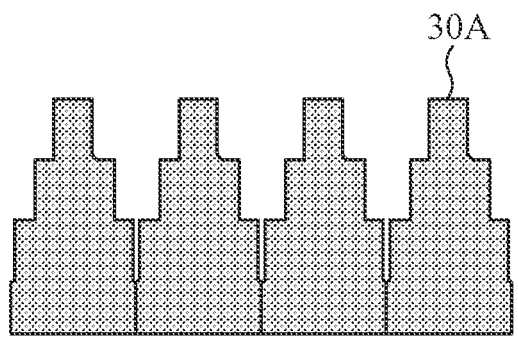
FIG. 9 is a diagram illustrating dielectric units each having a protruded shape included in a dielectric substrate according to a fifth embodiment of the invention.

FIG. 9 is a diagram illustrating dielectric units 30A each having a protruded shape included in a dielectric substrate according to a fifth embodiment of the invention. Multiple dielectric units 30A are regularly arranged on one surface of the dielectric substrate of the fifth embodiment. As illustrated in FIG. 9, the dielectric unit 30A has a protruded shape protruded stepwise.

For example, the dielectric unit 30A may have a shape that approximates a quadrangular pyramid, the shape being obtained by stacking multiple rectangular parallelepiped dielectric members having sizes that gradually decrease from the bottom side toward the distal end side.

Moreover, the portion that corresponds to the apex of the quadrangular pyramid of the dielectric unit 30 illustrated in the first to fourth embodiments may be the center point of the distal end surface of the uppermost step of the dielectric unit 30A.

Since the dielectric unit 30A has a shape protruded stepwise, the dielectric unit 30A is easy to manufacture by stacking as compared to a quadrangular pyramid. Furthermore, the dielectric substrates illustrated in the first to fourth embodiments may be replaced with the dielectric substrate having the dielectric units 30A.

Sixth Embodiment

Figure 10:
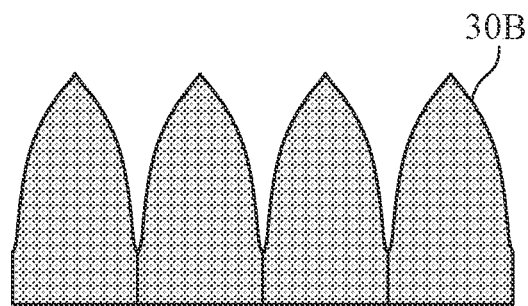
FIG. 10 is a diagram illustrating dielectric units each having a protruded shape included in a dielectric substrate according to a sixth embodiment of the invention.

FIG. 10 is a diagram illustrating dielectric units 30B each having a protruded shape included in a dielectric substrate according to a sixth embodiment of the invention. The multiple dielectric units 30B are regularly arranged on one surface of the dielectric substrate of the sixth embodiment. As illustrated in FIG. 10, the dielectric unit 30B protrudes in a curved shape in a longitudinal cross section thereof. The dielectric substrates illustrated in the first to fourth embodiments may be replaced with the dielectric substrate having the dielectric units 30B.

In a case where dielectric units are quadrangular pyramids, parameters that determine the shape of the dielectric unit are the size of the bottom and the height of the quadrangular pyramid, and the inclination from the apex to the bottom in the triangle in the longitudinal cross section. When the size of the bottom and the height of the quadrangular pyramid are fixed, the shape of the dielectric unit can be modified only by the above inclination.

Meanwhile, since the dielectric unit 30B protrudes in a curved shape in a longitudinal cross section, even in a state where the size of the bottom and the height corresponding to those of the quadrangular pyramid are fixed, the shape can be designed using various functions representing the curves (for example, a function representing a quadratic curve) as parameters. As a result, the degree of design freedom of the dielectric unit 30B can be increased, thereby enabling design of a structure that functions more appropriately as a matching layer.

Seventh Embodiment

Figure 11:
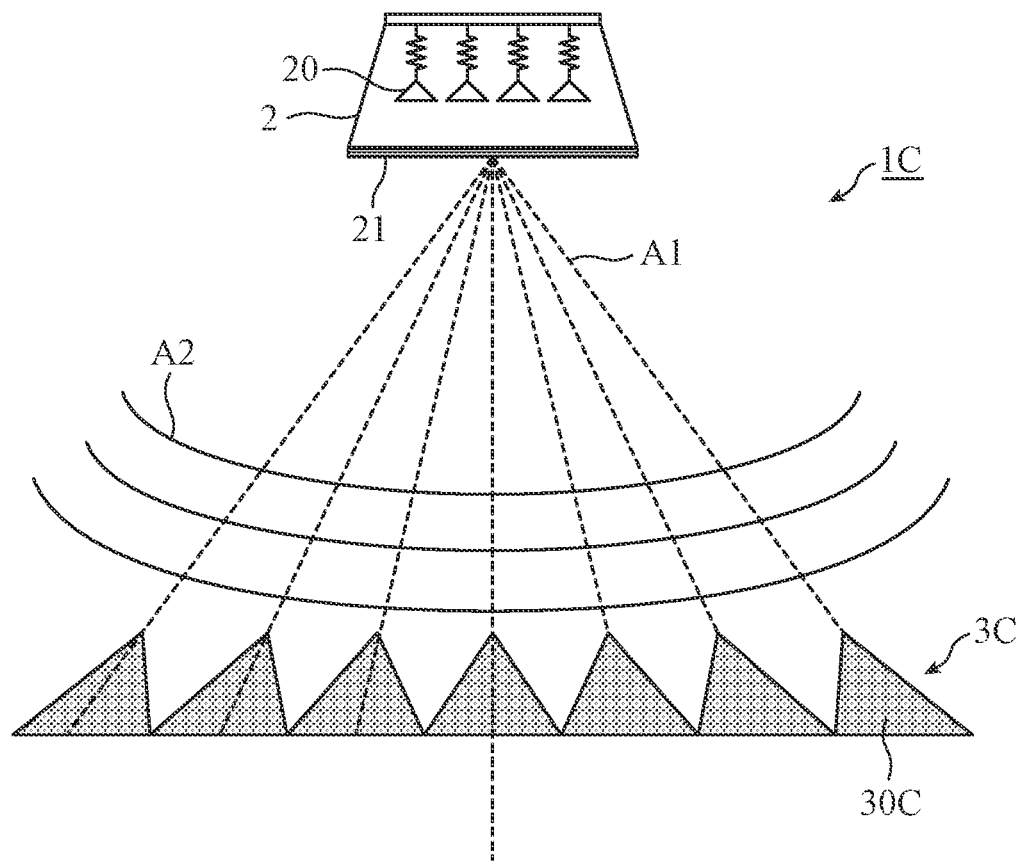
FIG. 11 is a cross-sectional view illustrating a configuration of a radar device according to a seventh embodiment of the invention.

FIG. 11 is a cross-sectional view illustrating a configuration of a radar device 1C according to a seventh embodiment of the invention. In FIG. 11, the same component as that in FIG. 1 is denoted by the same symbol and description thereof is omitted.

The radar device 1C according to the seventh embodiment includes a dielectric substrate 3C. In the dielectric substrate 3C, multiple dielectric units 30C are regularly arranged on the surface facing a radar main unit 2. In each of the multiple dielectric units 30C, a direction vector of a straight line connecting the distal end and the center point of the bottom of the protruded shape is facing the orientation of a radar wave in the radar main unit 2.

In the dielectric substrate 3 in the first embodiment, it is assumed that the radar wave from the radar main unit 2 satisfies the far-field condition, that is, that the radar wave is incident as a plane wave.

However, in a state where the radar main unit 2 and the dielectric substrate 3 are not sufficiently separated from each other and thereby the far-field condition is not satisfied, it is difficult to assume the radar wave as a plane wave. In this case, the radar main unit 2 emits an electromagnetic wave, which is a radar wave, in directions A1, and the radar wave enters the multiple dielectric units at wavefronts A2 that spread with respect to the traveling direction.

The dielectric substrate 3C according to the seventh embodiment is designed so that, in each of the multiple dielectric units 30C, a direction vector of a straight line connecting the distal end and the center point of the bottom of the protruded shape faces the orientation of a radar wave in the radar main unit 2. As a result, a dielectric unit 30C at an end of the dielectric substrate 3C has a shape inclined more toward the center than a dielectric unit 30C in the center part in accordance with the spread of the radar wave as illustrated in FIG. 11. Thus, even if the radar main unit 2 and the dielectric substrate 3C do not satisfy the far-field condition, reflection of the radar wave in the dielectric substrate 3C can be suppressed.

Note that the dielectric substrates illustrated in the first to fourth embodiments may be replaced with the dielectric substrate 3C. Furthermore, the dielectric unit 30C may protrude stepwise, or may protrude in a curved shape in a longitudinal cross section thereof.

Eighth Embodiment

Figure 12A:
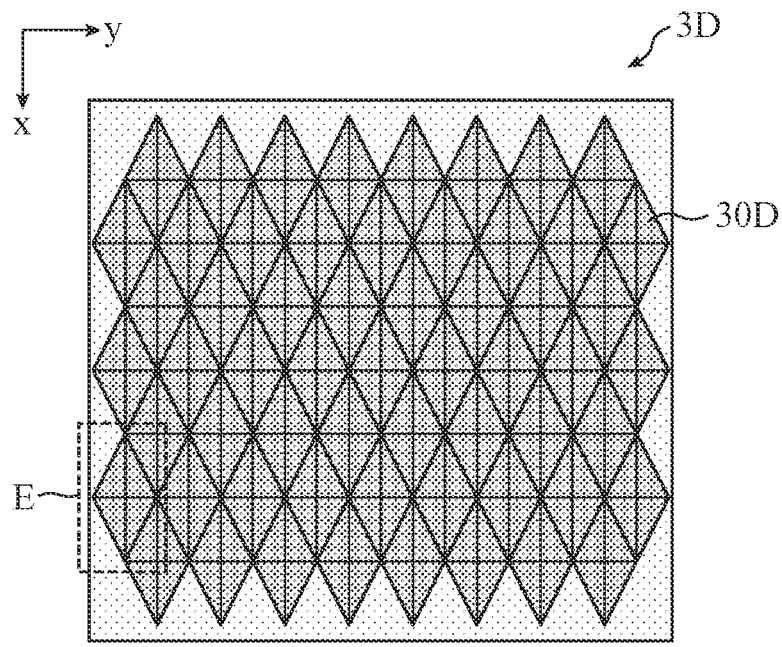
FIG. 12A is a plan view illustrating a dielectric substrate according to an eighth embodiment of the invention.
Figure 12B:
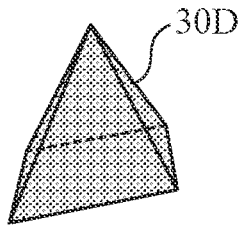
FIG. 12B is a perspective view illustrating a dielectric unit having a protruded shape included in the dielectric substrate of FIG. 12A.

FIG. 12A is a plan view illustrating a dielectric substrate 3D according to an eighth embodiment of the invention. FIG. 12B is a perspective view illustrating a dielectric unit 30D having a protruded shape included in the dielectric substrate 3D of FIG. 12A, and illustrates the dielectric unit 30D in a portion E encircled by the broken line in FIG. 12A in an enlarged manner.

As illustrated in FIG. 12B, the dielectric unit 30D has a quadrangular pyramid shape whose bottom is a parallelogram. On one surface of the dielectric substrate 3D, multiple dielectric units 30D are arranged in a triangular arrangement as illustrated in FIG. 12A.

In a case where a dielectric unit is a regular quadrangular pyramid, multiple dielectric units are arranged in a rectangular arrangement on one surface of the dielectric substrate. Meanwhile, the dielectric unit 30D in the eighth embodiment has a quadrangular pyramid shape whose bottom is a parallelogram, and thus the multiple dielectric units 30D can be arranged in a triangular arrangement on one surface of the dielectric substrate 3D. Thus, the density of the dielectric units 30D on the one surface of the dielectric substrate 3D is increased, and thereby the operating bandwidth as a matching layer can be broadened.

Note that the dielectric substrates illustrated in the first to fourth embodiments may be replaced with the dielectric substrate 3D. Furthermore, the dielectric unit 30D may protrude stepwise, or may protrude in a curved shape in a longitudinal cross section thereof. Furthermore, in each of the multiple dielectric units 30D, a direction vector of a straight line connecting the distal end and the center point of the bottom of the protruded shape may face the orientation of a radar wave in a radar main unit 2.

Note that the present invention is not limited to the above embodiments, and the present invention may include a flexible combination of the individual embodiments, a modification of any component of the individual embodiments, or omission of any component in the individual embodiments within the scope of the present invention.

INDUSTRIAL APPLICABILITY

A radar device according to the present invention improves the transmission characteristic of a radar wave incident on a dielectric surface, and thus is applicable to, for example, a distance measurement device for measuring the distance to an object present outside a vehicle by emitting the radar wave from the vehicle compartment to the outside.

REFERENCE SIGNS LIST 1, 1A to 1C: radar device, 2, 2A: radar main unit, 3, 3A to 3D: dielectric substrate, 20: antenna element, 21: radar cover, 30, 30A to 30D: dielectric unit, 31: adhesive layer, 32: reflection suppression layer, 100: windshield, 100a: first layer, 100b: second layer, 100c: third layer, 200: dielectric substrate, 300: gap

The invention claimed is:
1. A radar device comprising:
a radar main unit to emit a radar wave and receive a reflection wave of the radar wave reflected by an object; and
a flexible dielectric substrate in which multiple dielectric units each having a protruded shape are regularly arranged on one surface of the dielectric substrate, and the radar wave emitted from the radar main unit enters the multiple dielectric units in a state where another-surface side of the dielectric substrate is attached to a curved dielectric surface,
wherein the dielectric units each protrude stepwise and a thickness of the dielectric substrate on the another-surface side allows the dielectric substrate to be attached along the curved dielectric surface.

2. A radar device comprising:
a radar main unit to emit a radar wave and receive a reflection wave of the radar wave reflected by an object; and
a flexible dielectric substrate in which multiple dielectric units each having a protruded shape are regularly arranged on one surface of the dielectric substrate, and the radar wave emitted from the radar main unit enters the multiple dielectric units in a state where another-surface side of the dielectric substrate is attached to a curved dielectric surface,
wherein, in each of the multiple dielectric units, a direction vector of a straight line connecting a distal end and a center point of a bottom of the protruded shape is facing an orientation of the radar wave in the radar main unit, and
a thickness of the dielectric substrate on the another-surface side allows the dielectric substrate to be attached along the curved dielectric surface.

3. The radar device according to claim 1, wherein the dielectric units each have a polygonal pyramid shape or a conical shape.

4. The radar device according to claim 2, wherein the dielectric units each have a polygonal pyramid shape or a conical shape.

5. The radar device according to claim 3, wherein
the dielectric units each have a quadrangular pyramid shape,
each of the dielectric units having the quadrangular pyramid shape has a height of 0.1 to 0.2 times a wavelength of a center frequency of the radar wave emitted from the radar main unit, and sides of a bottom of the quadrangular pyramid shape each have a length of 0.1 to 0.2 times the wavelength,
the dielectric substrate has a thickness of 0.5 to 1.0 times the wavelength, and
an absolute value of an inner product of a direction vector of a straight line connecting an apex of the quadrangular pyramid shape and a center point of the bottom and a direction vector of the radar wave emitted from the radar main unit is equal to or less than cos (30°).

6. The radar device according to claim 4, wherein
the dielectric units each have a quadrangular pyramid shape,
each of the dielectric units having the quadrangular pyramid shape has a height of 0.1 to 0.2 times a wavelength of a center frequency of the radar wave emitted from the radar main unit, and sides of a bottom of the quadrangular pyramid shape each have a length of 0.1 to 0.2 times the wavelength,
the dielectric substrate has a thickness of 0.5 to 1.0 times the wavelength, and
an absolute value of an inner product of a direction vector of a straight line connecting an apex of the quadrangular pyramid shape and a center point of the bottom and a direction vector of the radar wave emitted from the radar main unit is equal to or less than cos (30°).

7. The radar device according to claim 1, further comprising:
a dielectric layer having a permittivity of a value between a permittivity of the dielectric substrate and a permittivity of the dielectric surface,
wherein the dielectric substrate is to be attached to the dielectric surface via the dielectric layer.

8. The radar device according to claim 2, further comprising:
a dielectric layer having a permittivity of a value between a permittivity of the dielectric substrate and a permittivity of the dielectric surface,
wherein the dielectric substrate is to be attached to the dielectric surface via the dielectric layer.

9. The radar device according to claim 1, wherein the dielectric substrate is a radar cover that covers an open surface for an antenna included in the radar main unit.

10. The radar device according to claim 2, wherein the dielectric substrate is a radar cover that covers an open surface for an antenna included in the radar main unit.

11. The radar device according to claim 2, wherein the dielectric units each protrude in a curved shape in a longitudinal cross section of a corresponding one of the dielectric units.

12. The radar device according to claim 1, wherein
the dielectric units each have a quadrangular pyramid shape whose bottom is a parallelogram, and
the multiple dielectric units are arranged in a triangular arrangement on the one surface of the dielectric substrate.

13. The radar device according to claim 2, wherein
the dielectric units each have a quadrangular pyramid shape whose bottom is a parallelogram, and
the multiple dielectric units are arranged in a triangular arrangement on the one surface of the dielectric substrate.

14. A radar device comprising:
a radar main unit to emit a radar wave and receive a reflection wave of the radar wave reflected by an object; and
a dielectric substrate in which multiple dielectric units each having a protruded shape are regularly arranged on one surface of the dielectric substrate, and the radar wave emitted from the radar main unit enters the multiple dielectric units in a state where another-surface side of the dielectric substrate is attached to a dielectric surface,
wherein, in each of the multiple dielectric units, a direction vector of a straight line connecting a distal end and a center point of a bottom of the protruded shape is facing an orientation of the radar wave in the radar main unit, and
the straight lines of the respective dielectric units cross at one point.

* * * * *